March 5, 1968  A. J. KIRKHAM  3,371,671
TENTS AND METHODS OF ERECTION
Filed Oct. 23, 1965  5 Sheets-Sheet 4
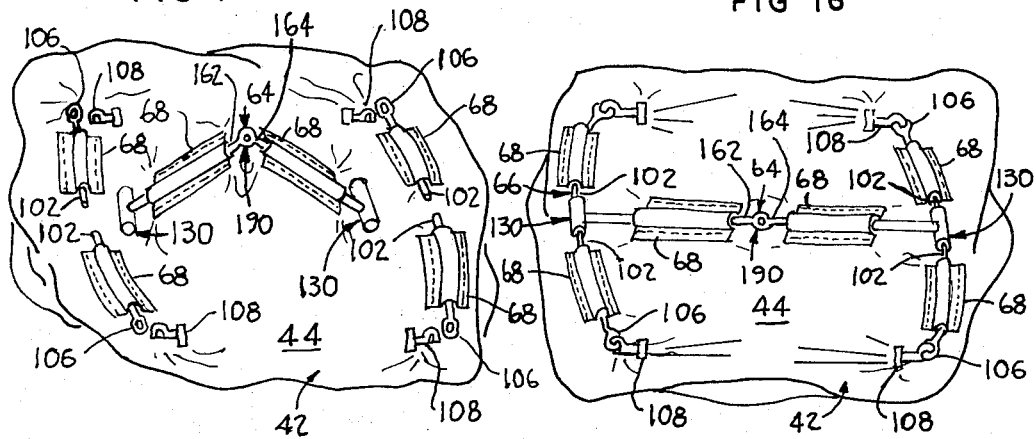
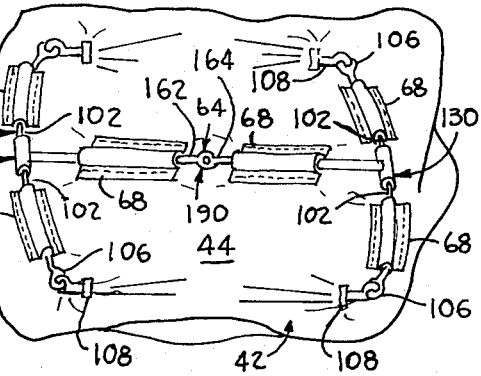
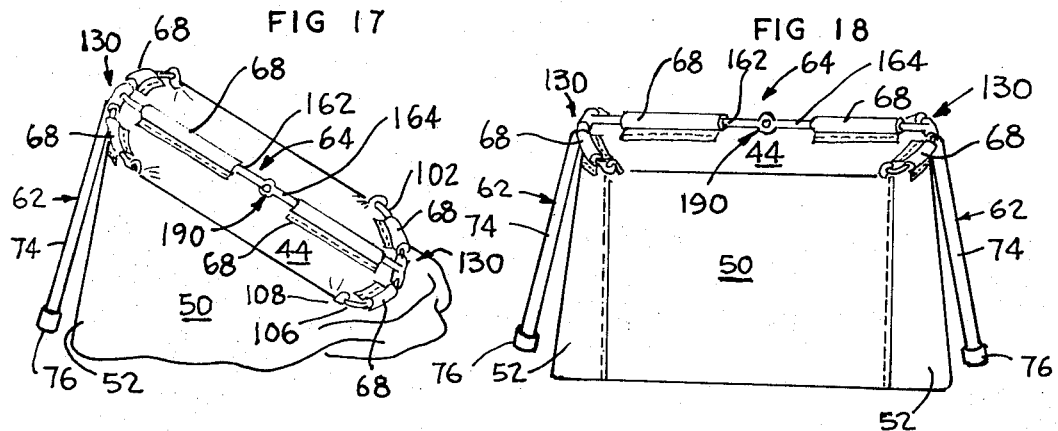
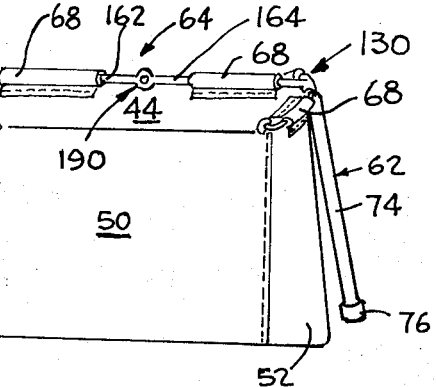
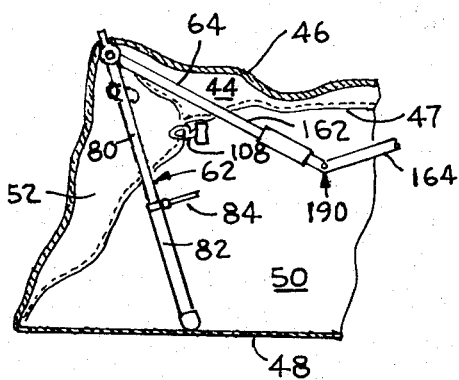
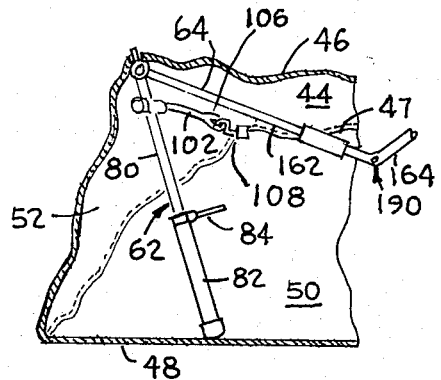
INVENTOR
ARTHUR J. KIRKHAM
Lynn G. Foster
ATTORNEY March 5, 1968  A. J. KIRKHAM  3,371,671
TENTS AND METHODS OF ERECTION
Filed Oct. 23, 1965  5 Sheets-Sheet 5
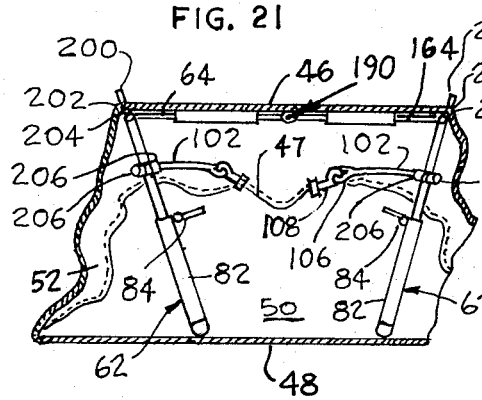
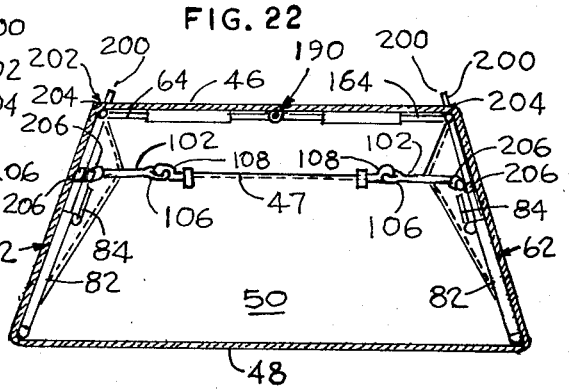
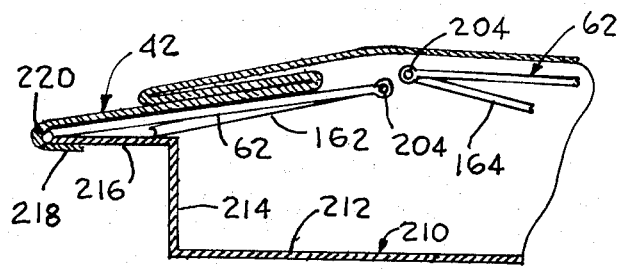
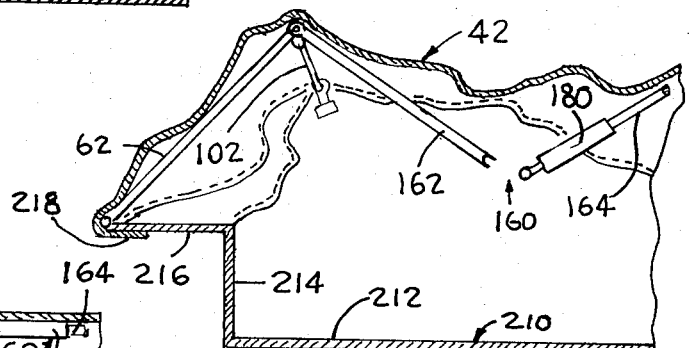
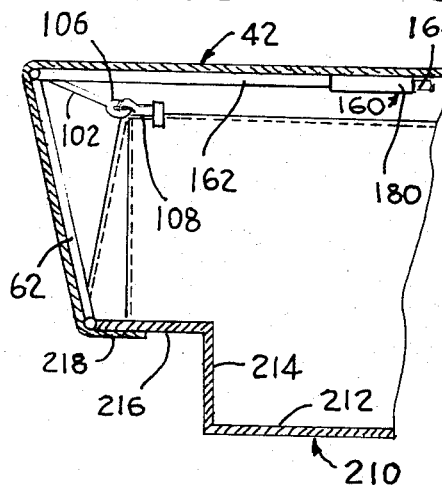
INVENTOR
ARTHUR J. KIRKHAM
*Lynn G. Foster*
ATTORNEY 3,371,671
TENTS AND METHODS OF ERECTION
Arthur J. Kirkham, 5534 Avalon Drive,
Murray, Utah 84107
Filed Oct. 23, 1965, Ser. No. 503,079
16 Claims. (Cl. 135—1)

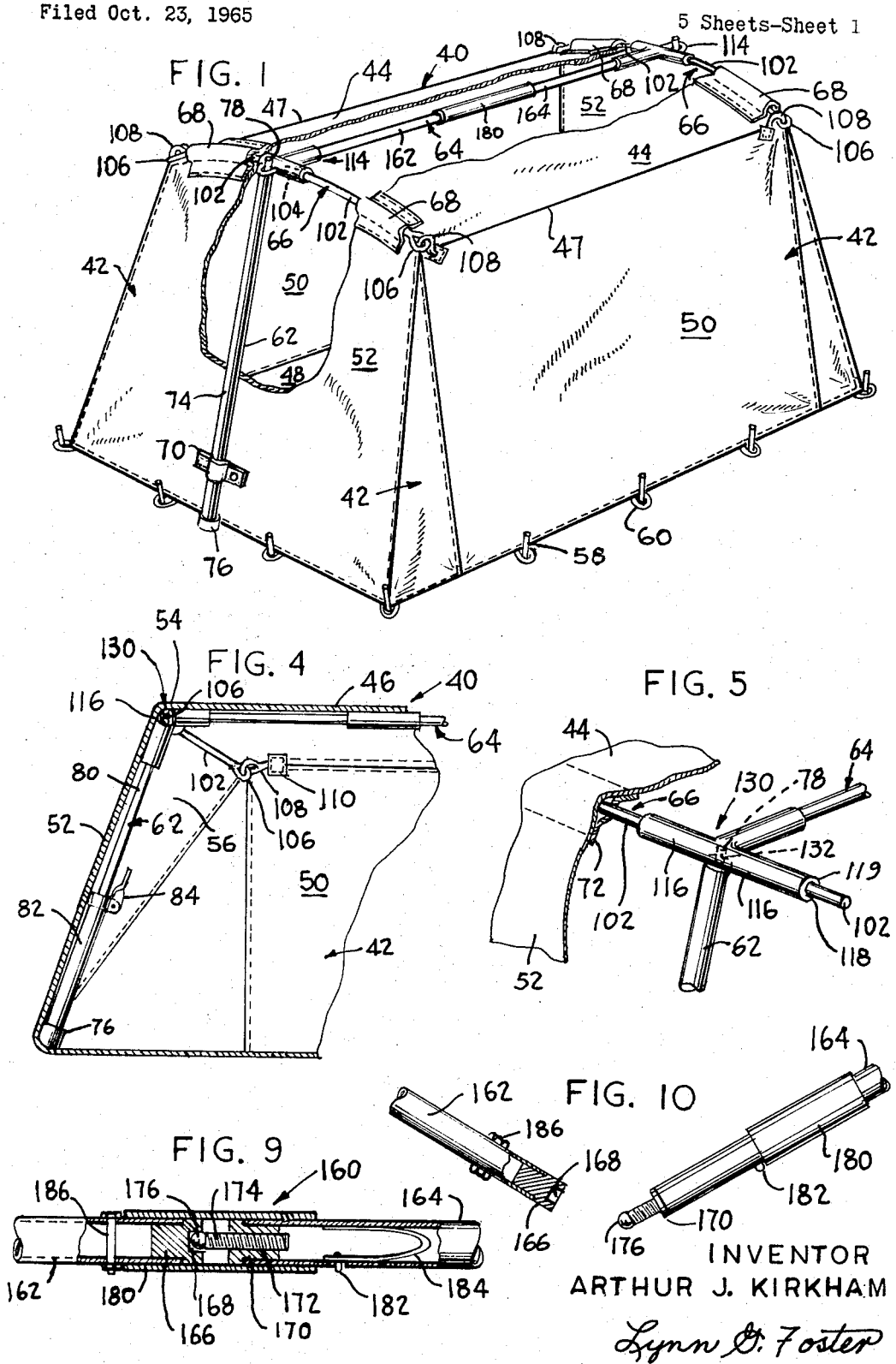

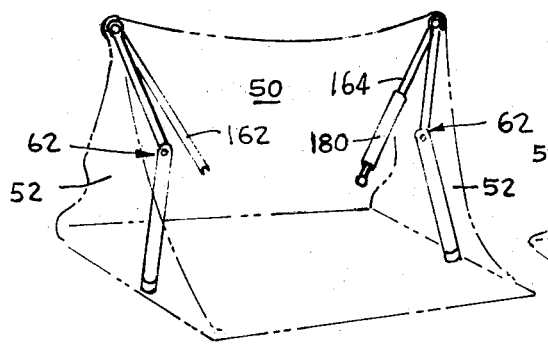
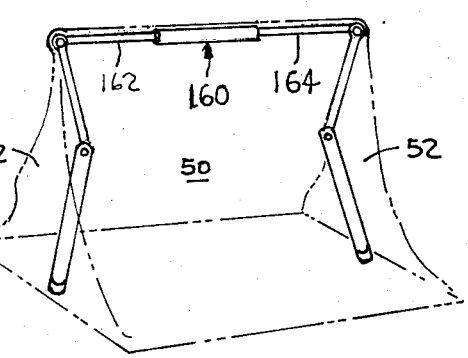
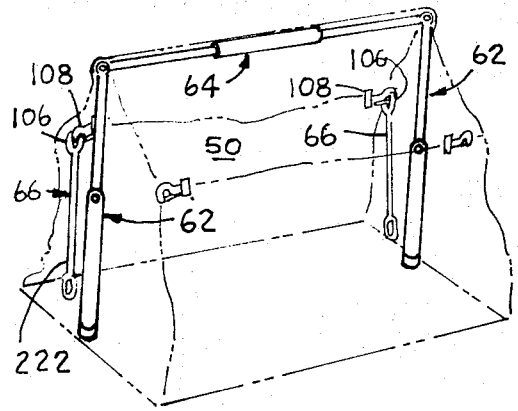
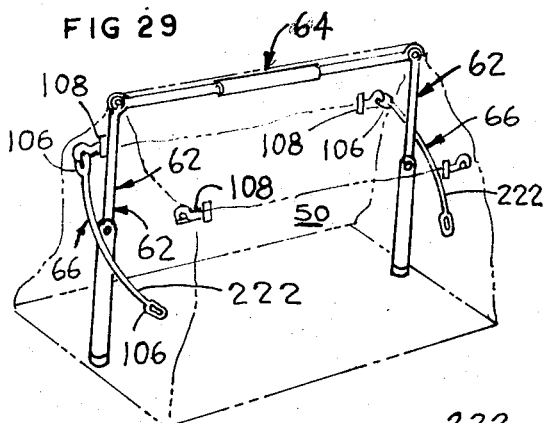
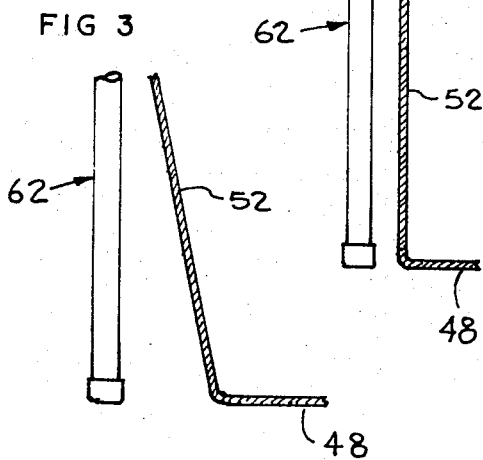
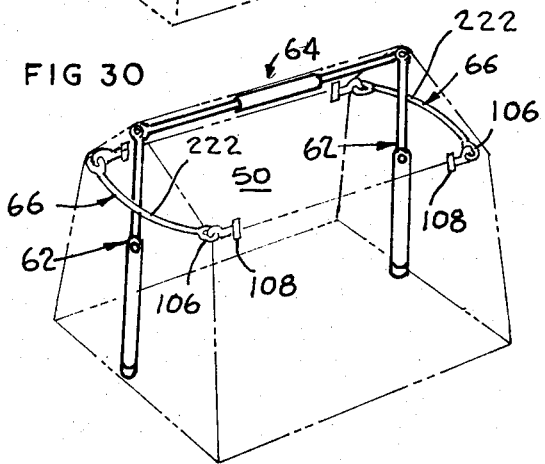

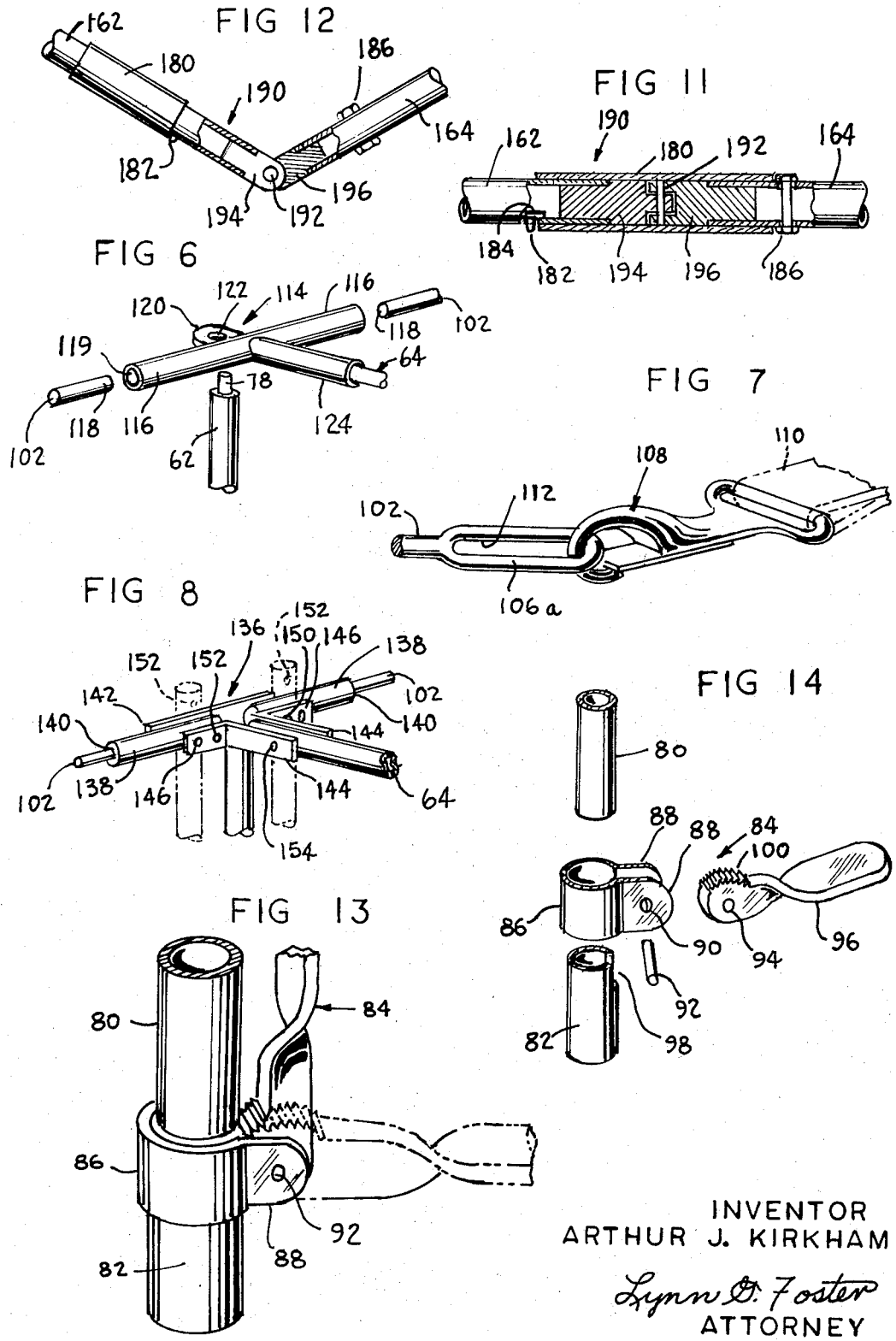

ABSTRACT OF THE DISCLOSURE

A tent construction having support structure comprising a ground-engaging, upright member to support the tent covering material upwardly and a sectioned ridge member, attached at one end to the upper end of the ground-engaging member, to urge the covering in an outward generally horizontal direction, and an elongated resilient member anchored at both ends to the tent covering material, coupled near its center to other of the support structure at or near the attachment between the upright and ridge members and having a length substantially greater than the straight line distance between anchor positions to urge the covering material both outwardly and upwardly into a taut condition responsive to placing the ridge sections in the fully erect position; novel clamp structure for telescopic tent poles; and methods of erecting tent constructions of the general type mentioned.

---

The present invention relates generally to tent construction and to methods of erecting the same. More particularly, this invention primarily relates (1) to novel methods of conveniently and safely erecting tent constructions so that the covering is stretched taut and the tent construction is made surprisingly stable and self-supporting, and (2) to unique support structure for safely erecting and holding the fabric enclosure or other flexible sheet covering in erect, taut condition (a) against both horizontally and vertically directed loads and (b) so as to retain the covering horizontally and vertically taut by self-compensating for expansion and contraction due to changes in temperature and moisture conditions.

Generally speaking, prior commercial tent constructions have possessed certain objectionable structural features and direction thereof has been cumbersome, confusing, and occasionally dangerous to the layman. Fundamentally, such prior devices have not succeeded in combining all of the following desirable features into one tent construction: (1) a virtual absence of interior and exterior obstructions, e.g. centrally located interior poles, exterior guy rope supports and the like; (2) an essentially "self-supporting" obstructionless tent support structure which not only holds the covering taut and smooth but has the structural integrity and rigidity necessary to withstand the normal forces of weather, without material deflection or deformation; (3) a tent support structure which does not encumber the tent or render the use of the tent aggravating or hazardous and which fully resists normal wind, snow, and like loads, regardless of the magnitude and line of action of the horizontal and vertical components thereof; (4) a self-supporting tent which is completely safe to erect and use; (5) a tent having the foregoing features and also possessing an abundance of head room and a well-arranged floor space for sleeping; (6) a tent support structure which resiliently imparts tension to stretch the covering taut, both horizontally and vertically, such that expansion and shrinkage of the covering due to changes in temperature and moisture conditions (which changes can be relatively large) are automatically accommodated without either creating sagging or over-tensioning of the covering; (7) a convenient method of erecting and taking down a tent construction which can be easily practiced by a non-technical person in a relatively short time and which obviates inadvertent collapse, in whole or in part, when used during normal weather conditions in the erected position.

The above-enumerated deficiencies of the prior art were substantially overcome, as verified by practical use and commercial success, by my previous invention disclosed in U.S. Patent 3,128,781. In the presently preferred form, the invention of the mentioned patent comprises an essentially "self-supporting," rigid tent construction which utilizes only three basic structural members, i.e., a ridge structural member, an upright structural member disposed immediately adjacent a wall portion of the tent and a horizontally disposed, prestressed, bowed resilient structural member. All the structural members, when finally positioned, are disposed in very close proximity to the tent covering and normally stakes are used only along the periphery of the base or floor of the tent so that virtually no exterior or interior obstructions are present. In said patent, the horizontal bow is described as being imparted to the resilient structural member by displacing the lower end of the upright structural member, about a fulcrum at its upper end, into close proximity to an adjacent wall portion of the tent. Such action forceably urges the resilient structural mmeber into contiguous relation with the covering. As a result, the covering is stretched taut and smooth, and the support structure is rendered substantially rigid.

While research and field experimentation have conclusively confirmed that the invention of U.S. Patent 3,128,781 possesses distinct advantages over the prior art, the research and experimentation have also contributed to the development of improved methods of erection and supporting structure which exhibit superior advantages, under some conditions, over my prior invention.

One presently preferred embodiment of the present invention, by way of example only, includes an upright member, an elongated resilient member means fastened at each end to the tent covering material and a novel ridge member which is sectioned, one ridge section being pivotally connected at one end to the upper end of the upright member and the other end pivotally linked, either separably or inseparably, to the other ridge section. The elongated resilient member means (a) is directly coupled to the upright member near or at the top thereof or to the junction between the ridge section and the upright member, and (b) is flexed into bowed configuration upwardly and outwardly to force the tent covering taut by the closing of the ridge sections into aligned, coaxial relation. The ridge sections may thereafter be secured in the aligned relation by a novel locking mechanism. The ground-engaging, upright member preferably is telescopic to accommodate setting the upright at any desired effective length and novel clamp or locking structure may be used to lock the extensible-retractable upright in any selected position.

Novel methods of erecting tent constructions of the general type set forth in this specification are also provided by the present invention.

With the foregoing in mind, it is a primary object of the present invention to provide novel methods of tent erection which can be easily and safely used by non-technical persons.

Another primary object of this invention is the provision of novel tent construction support structure which, when erected, affords maximum safety and unencumbered space during use and which is highly resistant to both horizontal and vertical load components imposed upon the cover, as for example by wind loads and snow loads.

Another significant object is the provision of a novel tent construction support structure which resiliently imparts a tension stress upwardly and outwardly to stretch the covering taut whereby both horizontal and vertical sagging and over-stressing of the covering, due to variations in temperature, moisture and like conditions, are avoided without necessitating manual adjustment of the support structure.

It is also an object of this invention to provide a novel tent construction system having one or more of the following features: a ridge structural member which is sectionalized to include a central hinge for accommodating easy and safe erecting and taking down of the tent construction, even by women and children; an elongated resilient structural member adapted for positioning in a bowed prestressed condition in a plane disposed in angular relation to both the horizontal and the vertical such that the covering is urged upwardly and outwardly to provide surprising resistance to both vertical and horizontal load components and to self-compensate for shrinkage and expansion of the covering; an elongated resilient structural member which is sectionalized, the sections of which can be easily anchored against inadvertent removal to both an upright elongated structural member and the covering, and which can alternately be hinged to the elongated upright structural member to accommodate ready collapse thereof when the tent is being taken down and also to accommodate locking of the sections in erected position when the tent is to be used; a resilient elongated structural member adapted to be easily anchored to the covering at opposed locations through use of an elongated eye loop at each end thereof, where the straight line distance between opposed locations is substantially less than the length of the resilient elongated structural member; one or more structural members which are telescopically extensible and each comprises a novel locking clamp which conveniently accommodates both changing the effective length of the telescopic structural member and firmly clamping the telescopic structural member at any desired effective length so as to completely prevent inadvertent collapse of the tent during use.

These and other objects and features of the present invention will become more fully apparent from the following description and appended claims taken in conjunction with the accompanying drawings wherein:

FIGURE 1 is a schematic perspective representation, with parts broken away for clarity, of a presently preferred structural tent embodiment of this invention;

FIGURES 2 and 3 are fragmentary schematic cross-sectional views depicting alternate ways in which the end wall may be disposed;

FIGURE 4 is a schematic fragmentary cross-sectional view of a tent construction similar to that of FIGURE 1, but with the support structure positioned interiorly rather than etxeriorly of the tent covering;

FIGURE 5 is a fragmentary schematic perspective view of a tent construction similar to that of FIGURE 4, but using interior pockets or sleeves through which at least some of the structural members pass;

FIGURE 6 is a schematic exploded perspective view of a presently preferred structure for connecting the structural members;

FIGURE 7 is a schematic perspective view of one preferred way of anchoring the elongated resilient structural member to the tent covering;

FIGURE 8 is a schematic fragmentary perspective view of the second presently preferred structure for connecting the structural members one to another;

FIGURE 9 is a schematic side elevation view, partially broken away for clarity, of a presently preferred central hinge of the ridge structural member, placed in the erected position;

FIGURE 10 is a fragmentary schematic side elevational view of the central hinge of FIGURE 9 in the collapsed position;

FIGURE 11 is a schematic fragmentary side elevational view, partly broken away for clarity, of a second presently preferred central hinge of the ridge structural member disposed in the erected position;

FIGURE 12 is a fragmentary schematic side elevational view, partly broken away for clarity, of the central hinge of FIGURE 11 in the collapsed position;

FIGURES 13 and 14 are fragmentary schematic perspective views of a novel cam locking clamp which accommodates ready variation in the effective length of a telescopic structural member and also firm clamping therein in a desired position against inadvertent release, FIGURE 14 being in exploded perspective;

FIGURES 15 through 18 are perspective schematic views illustrating one presently preferred method of erecting a tent construction;

FIGURES 19 through 22 depict in schematic cross-sectional representation a second presently preferred method of erecting a tent construction;

FIGURES 23 through 25 depict in fragmentary schematic cross-sectional representation a third presently preferred method of erecting a tent construction; and FIGURES 26 through 30 depict in schematic perspective a fourth presently preferred method of erecting a tent construction.

*Structural features*

Specific reference is now made to FIGURE 1 which depicts, in schematic perspective, a presently preferred tent construction, generally designated 40. The tent 40 comprises a suitable flexible covering generally designated 42. Normally the covering 42 is provided in a conventional manner with a suitable number of windows and doors (not shown). The flexible covering 42, which is of known type, comprises a top or roof 44 having a ridge line 46 and a pair of eave lines 47 (see FIGURE 4) extending generally longitudinal of the illustrated tent, a floor 48, longitudinal wall panels 50 extending generally vertically and spanning along the longitudinal axis of the tent, and end walls 52 disposed generally transverse to the longitudinal axis of the tent and extending in a generally vertical direction.

While it is sometimes desirable to construct the covering 42 to comprise an outwardly extended peak portion 54 (FIGURE 4) at the ridge line 46 such that the eave lines 47 have substantially less length than the ridge 46 and to construct the end wall panel 52 so as to have a substantial wingback configuration 56 (see FIGURE 4), such covering configuration is not critical and can be altered. A wide variety of covering variations in height, width, and length may thus be successfully used with the present invention. For example, the two end walls 52, shown as being a generally vertically extending though somewhat divergent one to the other in FIGURE 1, could be constructed to extend directly vertically as illustrated in FIGURE 2 or convergently one with respect to the other as depicted in FIGURE 3, if desired. Hence, a wide variety of covering configurations can be utilized in conjunction with the present invention.

Normally, as depicted only in FIGURE 1, the floor or base 48 of the tent is externally staked taut at the periphery thereof in a conventional way by driving suitable stakes 58 appropriately through the tent loops 60. In this way, the floor of the tent is held against displacement relative to the ground.

The tent construction 40 is held in erect and taut position by a structural support system which utilizes three basic "self-supporting" structural members. i.e. an elongated upright structural member generally designated 62 disposed, in erected position, immediately adjacent the end wall 52 at each end of the tent, a ridge structural member generally designated 64, disposed along the ridge line 46 of the covering 42, and an elongated resilient structural member generally designated 66, disposed at each end of the tent, illustrated as being generally arcuately disposed along the juncture between the roof 44 and the end wall 52 thereby extending in general transverse relation to both the upright structural members 62 and the ridge structural member 64. It is to be observed that the aforesaid three basic structural members each assume, in the erected position, an orientation immediately adjacent the covering 42 so that neither the space interior of the tent nor the space adjacent the tent 40 are obstructed in any way by the support structure.

It is also to be observed that in FIGURE 1 the three structural members, i.e. 62, 64, and 66, may be positioned external of the covering in pockets or sleeves 68 fabricated of flexible material, of the same type used to fabricate the covering 42, if desired. The sleeves 68 are suitably secured to the exterior of the covering 42, as for example by sewing or bonding.

A flap 70, illustrated in FIGURE 1, may be used to restrain the lower end of the upright structural member 62 in its erected position. The flap 70 is preferably suitably permanently secured at one end thereof to the end wall 52, as for example by sewing, and is preferably releasably attached to the end wall 52 at the opposite end thereof, as for example by means of a snap attachment. In this way, the flap 70 may be opened and closed to allow for convenient erecting and taking down of the tent construction 40.

The present invention can alternately be disposed in whole or in part interiorly of the tent construction 40. For example, the structural support members are illustrated in FIGURE 4 as being entirely within the tent construction 40 and are held in position without the use of pockets or sleeves. In FIGURE 5 pockets or sleeves 72 are used to locate at least some of the elongated resilient structural members 66.

With continued specific reference to FIGURE 1, the elongated upright structural member 62 of the support structure is depicted as being of one-piece construction. Here, a ground-engaging tubular pole 74 having a fixed length is used. The ground-engaging end of the pole 74 is protected by a suitable abrasion-resistant, wear-resistant and non-slip tip 76. The upper end of the pole 74 has an integral pin 78 used to unite the pole 74 with the other two basic structural members as will be explained in greater detail subsequently.

It is to be appreciated that the upright structural member 62 can be fabricated from any suitable material, such as spring steel, fibre glass, hardwood, or plastics.

In preference to the pole 74 of fixed length, the upright structural member 62 may be constructed so that its effective length may be readily varied.

A first such upright structural member having a variable effective length is depicted in FIGURE 4. Here, the upright structural member 62 comprises a telescopic support having one elongated member 80 slidably disposed in a second elongated member 82, which has a slightly larger maximum lateral dimension than does member 80. Preferably members 80 and 82 are tubular in cross-section.

The upright structural member of FIGURE 4 also uses the ground-engaging tip 76 which rests upon the floor 48 in this instance and a pin (not shown) at the upper end thereof.

A clamp, generally designated 84, is preferably used to lock the members 80 and 82 against relative movement once the tent construction 40 has been fully erected. When taking down the tent, the clamp 84 is merely released or swung from the locked to the inoperative position to accommodate sliding displacement of the member 82 upon the member 80.

One novel cam locking clamp which has exhibited great reliability, safety and ease of utilization, is depicted in FIGURES 13 and 14. Structurally the clamp 84 of FIGURES 13 and 14 comprises a bracket 86 integrally attached to the extreme upper end of the member 82 and having a pair of lugs 88 each containing an aperture 90 through which a pin 92 of suitable type is suitably placed in the assembled position. The pin 92 also rotatably passes through an aperture 94 in a cam arm 96. Thus, the cam arm can be easily pivoted about the pin 92 between the operative (closed) position shown in solid lines in FIGURE 13 and the inoperative (open) position shown in phantom lines in FIGURE 13. The cam arm 96 has a cam surface which contiguously bites the adjacent surface of the member 80 when placed in the operative position. A slot 98 (see FIGURE 14) disposed in the upper end of the member 82 accommodates contact between the cam surface and the member 80. The cam surface has been found to produce surprising results when a series of teeth 100 of comparatively hard material, such as hardened steel comprise the cam surface. Where each tooth is shaped to have a substantial length along each projecting point and dimensioned so as to only deform the external surface of the member 80 when placed in the operative position, crushing of the member 80 is avoided. Thus, the members 80 and 82 can freely slide one with respect to the other to vary the effective length of the upright 62, i.e. the tube 80 is not crushed out of round and yet the bite between the cam surface teeth 100 and the surface of the tube 80 in the locked position is virtually immovable responsive to loads which would normally be encountered during use. The greater the compression load exerted upon the upright structural member 60 comprising the member 80 and 82 the more firmly the teeth 100 bite into the external surface of the member 80.

A second upright structural member, the effective length of which may also be varied selectively, is illustrated schematically in FIGURES 26 through 30 and corresponds generally to the presently preferred ridge member 64, subsequently to be described.

The elongated resilient structural member 66 may be of either one or two-piece construction. When the tent 40 of FIGURES 1 and 4 is fully erected each resilient elongated structural member 66 will be disposed in a prestressed bowed orientation or configuration so as to lay in a plane which is angularly disposed with respect to both the horizontal and the vertical. In such prestressed bowed condition each member 66 exerts an upward and outward thrust upon the covering 42 causing the covering to be stretched taut both vertically and horizontally. In this position, experimentation has shown that the support structure has stronger resistance to horizontal and vertical components of snow and wind loads and the like and at the same time, surprising as it may seem, is sufficiently yielding or resilient to accommodate both horizontal and vertical expansion and shrinkage of the covering caused by temperature and moisture changes. In this way, the covering is always retained in a smooth, taut condition.

In both FIGURES 1 and 4 the elongated resilient structural member 66 is sectionalized, i.e. comprises separable sections 102, each preferably identical to the other, having a cylindrical end 104 and an eye loop 106.

In the erected position, the end 104 is disposed in cooperative relation with the upper end of the upright member 62 as will be explained in greater detail subsequently. The eye loop 106, disposed at the outside, extreme or remote end of each section 102, is secured to the covering 42 by suitable anchor means, e.g. the snap hook 108 depicted in FIGURE 7. Of course, the snap hook 108 is integrally joined to the covering in a suitable way, preferably at the eave corners by suitable means, for example the flexible strap 110 shown in FIGURE 7.

The elongated eye loop 106a of FIGURE 7 has been found to be of special advantage particularly when the length of the overall elongated resilient member 66 substantially exceeds the straight line distance between the anchor locations of oppositely disposed snap hooks. Use thereof greatly facilitates erecting and taking down the tent construction of this invention as the eye 112 can receive the snap hook 108 toward the back thereof with the snap hook 108 later being relatively displaced to the position illustrated in FIGURE 7 when the resilient sections 102 are stressed into their finally erected positions.

As can be seen by contrasting FIGURES 1, 4, and 5, external pockets, no pockets, and interior pockets may be used to receive the sections 102. Where sections are used to comprise the resilient elongated structural member, the inside end of each section should be suitably anchored to the remainder of the support structure, either directly or indirectly. While any suitable means may be utilized, in FIGURE 1 a T connector 114 is used.

The T connector 114 is more clearly shown in enlarged exploded perspective in FIGURE 6. Connector 114 comprises a pair of oppositely disposed sleeves 116 each having a cylindrical recess 119 to receive the inside or cylindrical end 118 of the adjacent section 102. The connector 114 also includes an exteriorly extending loop 120 possessing a central aperture 122 through which the pin 78 of the upright structural member 62 is adapted to pass and a third sleeve 124 recessed to receive the ridge structural member. The co-extensive sleeves 116 are disposed in generally perpendicular relation to the axes of the loop 120 and the sleeve 124.

As an option to the structure of connector 114 that of connector 130 may be used, as shown in FIGURES 4 and 5. The connector 130 is identical in all respects to the connector 114 with the exception that the loop 120 has been replaced by a recess 132 which opens downwardly to freely receive the pin 78 of the upright member 62.

Where a one-piece elongated resilient structural member is used in preference to the sectionalized type, a projection or recess near the upper end of the upright member adjacent the end wall 52 may be used to achieve a relatively stable cooperation between the two members.

Reference is now made to FIGURE 8 which depicts a third suitable connector, in T configuration, generally designated 136 which may also be used to anchor the elongated resilient sections 102 to the total structural support. Here, a pair of oppositely disposed sleeves 138 to which the sections 102 are integrally connected at 140 are movable between the erected position shown in solid lines in FIGURE 8 and the collapsed position shown in phantom lines in FIGURE 8. However, if desired, the ends 118 of the sections 102 may be directly connected to the fitting 136 thereby eliminating the need for sleeves. A bracket plate 142 and bracket angles 144 are used to join the structural members to the connector 136. A pin 146 is placed in position so as to pass between the plate 142 and each angle bracket 144 thereby rotatably carrying the adjacent sleeve 138.

A suitable detent pin 150 is biased so as to be inserted into a recess 152 in the end of the adjacent sleeve 138 in erected position. Thus, when so positioned, the sections 102 of the resilient elongated structure member 66 are restrained against collapse.

The detent pin 150 may be displaced to accommodate rotation of the sleeve 138 and the integrally attached section 102 to the phantom position of FIGURE 8 when the tent is being taken down.

The ridge 64 is joined to the angle brackets 44 either directly or by means of a sleeve or the like using a single pin 154 which accommodates pivotable movement of the ridge for purposes subsequently to be explained.

Specific reference is now made to FIGURES 9 and 10 and FIGURES 11 and 12 which depict two presently preferred ridge members.

The ridge member of FIGURES 9 and 10 includes a central hinge, generally designated 160, such that the central hinge components are separable when the ridge sections 162 and 164 are fully collapsed. Structurally, the central hinge 160 comprises a block 166 provided with a recess 168, the block being integrally secured to the end of the ridge section 162 by welding, threads or the like. The hinge 160 also comprises a second block 170 integrally secured to the ridge section 164 and having a central threaded bore 172. A threaded shaft 174, equipped with a ball configuration 176 at the distal end thereof adapted to fit in the recess 168 is threadedly joined to the block 170 at threaded bore 172. The threaded shaft 174 may be adjusted to vary the distance which it projects from the block 170 to accommodate slight differences in the ridge line length found in tent coverings of the same standard size.

During assembly, the ridge sections 162 and 164 are pivoted oppositely toward each other until the ball 176 contacts the socket 168 following which the ridge sections 162 and 164 are forced into a relatively straight substantially horizontal, generally co-axial aligned relation which thrusts the ridge 46 of the covering generally horizontally outwardly along the longitudinal direction of the tent. In this way, a substantial mechanical advantage is acquired making tent erection very easy for even women and children.

In order to lock the central hinge 160 in its erected position and thereby inadvertent collapse, a locking sleeve 180 is used. The locking sleeve 180 is so dimensioned as to be slidable relative to the ridge sections 162 and 164. In collapsed position, the locking sleeve 180 is positioned as shown in FIGURE 10 with the detent pin 182 restraining the sleeve from slipping off the ridge member 164, the detent pin 182 being biased outwardly by a spring 184 (FIGURE 9).

To lock, once the ridge sections 162 and 164 have been placed in aligned straight relation, the detent pin 182 is depressed, the sleeve 180 is displaced to the position of FIGURE 9 where the detent pin 182 and a suitable through pin 186 restrains the sleeve 180 in a locked position. Thus, the central hinge may not now be broken. To collapse, the detent pin 182 is depressed and the sleeve 180 displaced upon the ridge section 164, when it is desired to take down the tent. By use of such a central ridge relatively simple methods of tent erection can be practiced in a foolproof, easy, safe way by non-technical persons.

Reference is now made to FIGURES 11 and 12 which depicts a second presently preferred central hinge adapted to be disposed between the ridge sections 162 and 164. Basically, the central hinge 190 differs only from the hinge 160 in that it can be made either non-separable or separable. More specifically, the pin 192, which pivotally joins the sections 162 and 164 through use of the block 194 and 196, can either readily be removable or not. When removable, the central hinge 190 can be easily separated.

The operation of central hinge 190 of FIGURES 11 and 12 is generally the same as that of the central hinge 160 previously described.

The ridge sections 162 and 164 may be directly joined at their remote ends to the connectors of the type described in conjunction with FIGURES 5, 6 and 8, and may be also adapted to be slip-fit into an appropriately fashioned recess in the connector. The T fittings 114, 130, and 136 or other such suitable connectors will accommodate a limited amount of rotational movement for such insertion.

While only one central hinge is depicted and described, it is to be appreciated that more than one central hinge can be utilized if desired as might be useful with tents of extremely long length. It is also to be appreciated that the ridge construction as described above, is suitable for use as an upright structural member in a manner schematically depicted in FIGURES 26 through 30.

*Method features*

This invention provides several highly advantageous and safe methods of erecting tent constructions.

*The method of FIGURES 15–18*

One such method is shown in FIGURES 15–18. The primary advantage of the method of FIGURES 15–18 is in the ease and safety with which the tent construction can be erected completely from the outside of the tent so that the user need occupy the interior of the tent only after the tent is fully erected. Only a relatively few steps are required, which may be practiced in complete safety, and exertion of great strength is not necessary.

In erecting the tent of FIGURES 15–18, initially the resilient sections 102 of the resilient enlongated structural member are loosely positioned in the transverse covering pockets 68 and the centrally hinged ridge member 64, comprising sections 162 and 164, is similarly positioned in the longitudinally extending pockets 68, all as schematically shown in FIGURE 15. Preferably, when the tent construction is being erected upon the ground and, at a point earlier in time, the base or floor 48 of the tent will have been staked taut along the periphery thereof, for example by using stakes 58 and tent loops 60 (FIGURE 1) or other suitable floor anchoring means.

Thereafter, the sections 102 are anchored individually at the eye loops 106 to the covering by use of the snap hooks 108 or other suitable means. Likewise, the inside end of each section 102 is appropriately anchored to the support structure, for example by disposing the end within a cylindrical recess in the T connector 130. Once the resilient sections 102 have been suitably anchored to the covering at their extreme or outside ends and to suitable connectors or the like at their inside ends, a substantially vertical force is exerted by the erector in a downward direction at the central hinge or joint 190 of the ridge member. This causes the ridge sections to move from the angular position shown in FIGURE 15 to the serially aligned straight position depicted in FIGURE 16.

Suitable locking means may, at this point in time, be employed to restrain the ridge member 64 in its straight position. Straightening out of the ridge member 64 thus draws the roof 44 of the tent into taut condition imposing a compressive load upon the ridge member and forcing each resilient elongated structural member 66 into a bowed, stressed condition, as also depicted in FIGURE 16.

Next, an upright member is placed in final position at each end by first placing the pin, at the upper end thereof, in a prepared recess, as previously described, in the T connector 130 or the like with the upright 62 divergently disposed away from the end wall 52. Then, by shifting the lower end of each upright member into a substantially erect orientation immediately adjacent the wall end 52, the tent walls 50 and 52 are stretched taut by action of the three basic structural members. In this way, the resilient elongated structural member 66 is deflected into fully bowed configuration, disposed generally as shown in FIGURE 1, in a plane which is angular to both horizontal and vertical to provide substantial resistance to horizontal and vertical components of force exerted upon the covering of the tent and to self-accommodate horizontal and vertical shrinkage and expansion incurred by changes in temperature and moisture conditions. Thus, when the foregoing steps have been practiced, the tent will appear as depicted in FIGURE 18.

In this position, the elongated resilient member comprising the sections 102 is subjected to two loads. First, a bending load is exerted by the outward force of the ridge member 64, which is resisted by the covering at the anchor points identified by numeral 108 (the ridge line being substantially longer than the eave line of the tent). Moreover, to function appropriately, the resilient elongated structural member is so dimensioned as to be subjected to an axial tension load created by the above-described bending action. This causes the loops 106 of the resilient sections 102 to pull upon the anchor points 108. By the described loading of the resilient elongated structural members the tent is resiliently drawn smooth and taut longitudinally, vertically and transversely.

*The method of FIGURES 19–22*

A second presently preferred convenient and safe method of erecting a tent construction is illustrated consecutively in FIGURES 19–22, inclusive. To erect, a pin 200, integrally projecting from the upper end of the vertical upright member 62, is positioned in a reinforced aperture 202 at each end of the covering ridge line as shown in FIGURE 19. The extreme ends of the ridge member 64 at pivot 204 are pivotally joined, either integrally or separably, to the upper end of the adjacent upright structural member 62 so as to be swingable relative thereto. In this instance, the upright 62 is illustrated as being a telescopic member of the general type described in conjunction with FIGURES 4, 13 and 14 and, furthermore includes a pair of generally oppositely disposed sleeves 206, each possessing a cylindrical recess to each receive an inside end of resilient section 102.

Thereafter, each resilient section 102 is anchored at its respective ends to the adjacent anchor point 108 and to the sleeve 206, as previously described, each upright 62 being divergently disposed with respect to the adjacent end wall 52 as illustrated in FIGURE 20 so that exertion of substantial force is not required to anchor the sections 102.

As shown in FIGURE 21, the support structure is next manipulated by exertion of an upward substantially vertical force upon the ridge member 64 such that the central hinge 190 causes an opposite swinging motion of the ridge sections 162 and 164 until such sections are brought into substantially horizontal continuous straight alignment. This results in the roof 44 of the tent construction being stretched taut.

Either preceding or subsequent to the previously described step, each telescopic upright structural member 62, comprising sections 80 and 82, is shifted from the position of FIGURE 21 to the position of FIGURE 22 with the clamp assemblies 84 in the open position accommodating first reduction and then extension of the effective length of the upright member 62. When the upright is positioned immediately adjacent the end wall 52 so that its effective length is increased to a maximum distance as permitted by the covering 44, the cam locking clamp 84 is shifted from the opened to the clamped or locked position to restrain the sections 80 and 82 against relative movement, as previously described. Thus, the three basic structural members are placed in their respective operative positions and the covering is resiliently stretched taut.

Naturally, the central hinge 190 of the ridge member 64 is preferably locked into the erected position to prevent inadvertent collapse.

*The method of FIGURES 23–25*

Where it is desired to use the present invention as a camping trailer tent or auto top tent or the like, the method depicted in FIGURES 23–25, inclusive, provides an extremely convenient and safe technique.

Here, a camping trailer bed schematically illustrated and generally designated 210 comprises a base 212, parallel side walls 214 and a peripheral lip 216. The covering 42 is suitably secured to the peripheral lip 216 at edge 218 and the lower end of the upright structural members 62 are suitably pivotally attached at 220 to the upper edge of the lip 216 in a substantially stationary position.

Upon arrival at a camp site or the like, the camping trailer will be positioned as generally schematically illustrated in FIGURE 23. Thereafter, the upright structural members 62, preferably with the ridge sections 162 and 164 respectively pivotally attached thereto at 204 are rotated oppositely about their respective fixed lower ends 220 from the position of FIGURE 23 to that of FIGURE 24. At this time, the resilient sections 102 are installed, in the manner earlier described, the installation being relatively easy as no substantial force is required with the covering 42 hanging loosely upon the support structure.

Thereafter, the ridge sections 162 and 164 are oppositely pivoted about the pivot connections 204, which also oppositely pivots the respective upright structural members 62, until the ball and socket of the central hinge 160 are brought into contact one with the other. Then an upward force is exerted upon the ridge 160 until the sections 162 and 164 are positioned in a substantially horizontal straight aligned relation with each other. This forces the three basic structural members into their final erected position stretching taut the tent covering as shown in FIGURE 25.

Preferably the central hinge 160 is then locked to prevent inadvertent collapse during use. Naturally, the threaded shaft 174 (FIGURE 9) has been previously adjusted relative to the block 170 to appropriately establish the correct effective length of the overall ridge member 64 for achieving the desired magnitude of stretch in the covering.

The method of FIGURES 26–30

Under some circumstances it has been found to be desirable to first place the upright member 62 and the ridge member 64 in their final position before installing the elongated resilient structural member in its bowed position. This procedure is particularly desirable when the end wall portion has a substantial wingback effect (i.e. where the ridge line of the covering extends a significant distance beyond the eave lines of the covering). Thus, the overall end to end length of the elongated resilient member necessarily would be significantly greater than the straight line distance between the covering anchor points, identified by the numeral 108. However, the practice of this method is not restricted to tent coverings having a substantial wingback effect.

To erect, the centrally hinged ridge member 64 and the centrally hinged upright members 62 the sections thereof are forced into substantially straight line relation to assume their final position (see FIGURES 26–28). Preferably the central hinge of each is locked to prevent inadvertent collapse.

Thereafter, the one-piece resilient member 222 is hooked or anchored to the covering by joining the elongated eye loop 106 to the anchor structure 108 (see FIGURE 28). Next, the resilient member 222 is forceably bowed and concurrently pivoted upward about the fulcrum at the anchored loop 106a until the free end thereof is forced between the end wall 52 of the covering and the adjacent surface of the upright member 62 (see FIGURE 29).

Next, the free end of each resilient member 222 is further forceably bowed, using the engagement between the resilient member 222 and the upright support 62 as the fulcrum. Thereafter, the free eye loop 106 is secured or anchored to the adjacent anchor 108 to finally position the support structure in the fully erected condition thereby stretching taut the covering.

Where it is advantageous to prevent any subsequent movement of the resilient member 222 relative to the upright members 62, a suitable projection or recess (not shown) disposed on the external surface of the upright 62 to be engaged by the member 222 may be used.

Summary

Thus, the previously described structural and method features of the present invention accommodate improved resistance to horizontal and vertical loads, self-accommodate shrinkage and expansion of the covering both horizontally and vertically, resilient retention of the covering in taut condition always, a maximum of roomy unencumbered space both interiorly and exteriorly of the tent, a high order of structural stability and rigidity which fully restrains against inadvertent collapse in whole or part during use, and easy and safe procedural use to erect and take down a tent construction.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed and desired to be secured by United States Letters Patent is:

1. In a tent construction and the like, a sheet of flexible covering material in combination with support structure for holding the covering material in erect and taut condition, said support structure comprising a ground-engaging elongated upright member supporting the covering material primarily in an upward direction at one end, a multisection ridge member joined near one end thereof to the elongated upright member for holding the covering material primarily in an outward generally horizontal direction when fully erected, the ridge member being supported at the other end thereof and elongated resilient means, the ends of which are respectively anchored to the covering material and a central portion of which is anchored to one of the support structure near the juncture between the upright member and the ridge member so as to essentially prevent up and down and side to side movement of the elongated resilient means relative to the remainder of the support structure such that placement of the ridge sections in generally aligned and coaxial relation one to another will at least in part cause said elongated resilient means to be forcibly flexed in a curvilinear configuration within a plane angularly disposed with respect to both the horizontal and the vertical, the length of the elongated resilient means being substantially greater than the straight line distance between said two covering anchored positions, said bowed elongated resilient means continuously urging the adjacent covering material outwardly and upwardly whereby the covering material is urged both vertically and horizontally into said taut condition, enabling the covering to strongly resist both the horizontal and vertical components of wind loads, snow loads, and like loads and to resiliently accommodate both horizontal and vertical expansion and shrinkage of the covering caused by temperature and moisture changes by retaining the covering taut without over-stressing and without creation of sagging in the covering.

2. A tent construction as defined in claim 1 wherein said elongated resilient means are disposed at least in part within sleeve means of flexible material external of the covering material.

3. A construction as defined in claim 1 wherein the extreme ends of said elongated resilient means each comprises an elongated eye loop to accommodate ease of anchoring the same to the covering.

4. In a tent construction and the like, a sheet of flexible covering material in combination with support structure for holding the covering material in erect and taut condition, said support structure comprising a ground-engaging elongated member supporting the covering material primarily in an upward direction, elongated resilient means, two ends of which are anchored to the covering material and the central portion of which is disposed near the upper end of the ground-engaging member and a ridge member comprising two sections joined one to another at a central pivot joint and one end of which is associated with the upper end of the ground-engaging member to forcibly flex the resilient means into bowed configuration within a plane angularly disposed with respect to both the horizontal and the vertical once the ridge sections are forced from relative angular positions to generally coaxial aligned relation independent of the position of the ground-engaging member thereby urging the covering material outward the length of the elongated resilient means being substantially greater than the straight line distance between said two covering anchored positions, said bowed elongated resilient means continuously urging the adjacent covering material outwardly and upwardly whereby the covering material is urged both vertically and horizontally into said taut condition, enabling the covering to strongly resist both the horizontal and vertical components of wind loads, snow loads, and like loads.

5. In a tent construction and the like, a sheet of flexible covering material in combination with means for holding the covering in taut erect condition, said means comprising anchor means carried by the covering, ground-engaging elongated upright means, a generally horizontally extending ridge member holding the elongated upright means in a relatively stationary position and an enlongated resilient member the ends thereof being anchored to the covering at said anchor means the central portion of the elongated resilient member being restrained in a generally arcuate prestressed configuration between the two anchors and the elongated upright means by co-action of the elongated upright means and the ridge member, the generally arcuately-shaped elongated resilient member, lying in a plane forming acute angles with both the vertical plane and the horizontal plane and crossing the elongated upright means at an elevation at least as great as the upper end of the elongated upright means.

6. The construction of claim 5 wherein at least said ground-engaging elongated upright means are situated external of the covering.

7. In a method of erecting a tent construction and the like comprising an enclosure of flexible material and support structure including a centrally hinged ridge member having at least two sections, an elongated upright member and a resilient elongated transverse member, the steps of:
 (a) anchoring the upper end of the elongated upright member to a predetermined location in close proximity to the flexible enclosure with the lower end of the elongated upright member being ground supported and divergently disposed with respect to the adjacent enclosure wall surface,
 (b) positioning the resilient elongated transverse member in generally transverse relation to the elongated upright member with the ends of the resilient elongated transverse member disposed immediately adjacent the enclosure material at predetermined locations,
 (c) shifting the lower end of the elongated upright member toward the adjacent enclosure surface into its final position,
 (d) forcing the centrally hinged ridge member from an open position where the ridge sections are angularly disposed one toward the other, with the end of the ridge member adjacent the upright member situated in anchored relation in close proximity to the ridge of the enclosure, and the other end of the ridge member being suitably supported, to accommodate the mentioned shifting of the elongated upright member, to a closed position where the ridge sections are serially and generally coaxially aligned one with the other such that the resilient elongated member is caused by the closing of the ridge sections to be flexed into a bowed configuration against the enclosure to force the enclosure taut along its sides, front and back as well as along the ridge thereof.

8. A method as defined in claim 1 wherein step (c) is performed subsequent to step (d).

9. A method as defined in claim 7 wherein said resilient elongated member is sectionalized and wherein step (b) comprises the substeps of directly coupling each section of the resilient elongated member (1) to the enclosure in one of said predetermined locations and (2) also to another member of the support structure.

10. A method as defined in claim 7 wherein said step (c) comprises the substeps of varying the effective length of the elongated upright member, shifting the lower end of the upright member into immediate proximity to a wall of the covering and clamping the elongated upright member in its final position at a selected effective length.

11. A method as defined in claim 7 where said two ridge sections are separable one from the other at the central hinge and wherein said step (d) comprises the substeps of oppositely swinging the central ridge sections first into angularly related contiguous relation one with the other at the central hinge and thereafter displacing the ridge sections into substantially aligned generally coaxial relation one with the other, and further including the step of locking the central hinge in said latter position to prevent inadvertent relative displacement of the ridge sections.

12. In a method of erecting a tent construction and the like comprising a flexible covering and a support structure including a centrally hinged ridge member having at least two sections, an elongated upright member, and a resilient elongated member, the steps of: placing one extreme end of the ridge member in cooperation with the elongated upright member in the vicinity of the upper end of the elongated member with the ridge sections angularly disposed with respect to the horizontal while suitably supporting the other extreme end of the ridge member, and with the lower end of the elongated upright member disposed in its final position, anchoring the extreme ends of the resilient elongated member relative to the covering at the prepared locations, oppositely swinging the ridge sections into serially aligned essentially horizontal relation:
 (a) forcing the extreme ends of the ridge member outward such that the covering adjacent the ridge member is stretched taut as the ridge member is placed in compression,
 (b) rotating the upper end of the elongated upright member in an outward direction with the lower end of the elongated upright member acting as the fulcrum, and
 (c) stressing the resilient elongated member into a bowed configuration, to stretch the covering taut.

13. In a method of erecting a tent construction and the like comprising a flexible covering and a support structure including a ridge member, an elongated upright member and a resilient elongated member, the steps of:
 (a) placing and supporting the elongated upright member in its final position adjacent a generally vertically extending wall portion of the covering such that the covering is urged upwardly and the elongated upright member is placed in compression,
 (b) placing the ridge member in its final generally horizontal position adjacent the covering to urge the covering outwardly thereby placing the ridge member in compression, and
 (c) installing the resilient elongated member by performing the following steps in desired sequence:
  (1) anchoring one remote end of the resilient elongated member to the covering at a location horizontally spaced from the elongated upright member,
  (2) disposing the resilient elongated member in bowed stressed relation along the vertically extending wall portion of the covering stretching the same taut,
  (3) bringing the resilient elongated member into cooperation with the elongated upright member in the vicinity of the upper end thereof, and
  (4) anchoring the other remote end of the resilient elongated member to the covering at a location horizontally spaced from the elongated upright member.

14. In a method of erecting tent and like constructions comprising a flexible covering and support structure including an elongated upright member and a resilient elongated member, the steps of: placing the elongated upright member in its final position adjacent a generally vertically extending wingback wall portion of the covering such that the upper and lower ends of the elongated upright member are in substantially stationary positions, installing the resilient elongated member in essentially transverse relation to the elongated upright member by practicing the steps of:

(a) anchoring one remote end of the resilient elongated member to the covering, (b) bending the resilient elongated member along the wingback wall portion and interposing the same between the elongated upright member and the wingback wall portion, and (c) anchoring the other remote end of the resilient elongated member to the covering such that the resilient elongated member is sustained in a curvilinear stressed condition stretching taut the wingback wall and adjacent portions of the covering.

15. In a method of erecting a tent such that the covering is stressed by support structure into taut condition, generally vertically by an elongated upright member, generally longitudinally by a centrally hinged ridge member and generally transversely by a resilient elongated member, the performance of the following steps in desired order: installing the elongated upright member generally intermediate the top of the covering and the ground immediately adjacent a generally vertically extending wall such that the upper and lower ends of the elongated upright member are in substantially fixed relation relative to the covering, installing the resilient elongated member in contiguous bowed relation along said wall essentially transverse of both the elongated upright member and the ridge member, the ends of the resilient elongated member being anchored to the covering and cooperating with the elongated upright member such that the resilient elongated member is held in substantially fixed position relative to the covering, and installing the ridge member by forcing the central hinge of the ridge member from an angular position to an aligned substantially horizontally extending position with both remote ends thereof being suitably supported and one of said remote ends cooperating with the upright member near the top end thereof.

16. In a method of erecting tent and like constructions comprising a flexible covering and support structure including a resilient elongated member comprising at least two sections and an elongated upright member, the steps of:

placing and structurally retaining the upper end of the elongated upright member generally in its final position relative to the covering and placing the lower end divergently disposed with respect to a generally vertically extending wingback wall portion of the covering, anchoring the ends of the sections of the resilient elongated member respectively to the elongated upright member and the covering such that the sections no more than loosely contact the covering, and shifting the lower end of the elongated upright member into a position immediately adjacent the wingback wall portion of the covering, whereby the sections of the resilient elongated member are stressed into a bowed configuration forceably urging the covering taut.

References Cited

UNITED STATES PATENTS

| | | | |
|---|---|---|---|
| 2,719,693 | 10/1955 | Penberthy. | |
| 2,817,548 | 12/1957 | Uthemann. | |
| 498,574 | 5/1893 | Ryan | 160—224 X |
| 1,601,664 | 9/1926 | Ackerman | 135—4 |
| 1,684,237 | 9/1928 | Marbury | 135—1 |
| 2,167,861 | 8/1939 | Baruch | 135—1 |
| 2,210,342 | 8/1940 | Sater | 135—1 |
| 2,938,524 | 5/1960 | Benson | 135—1 |
| 2,967,585 | 1/1961 | Bybee et al. | 135—184 |
| 3,128,781 | 4/1964 | Kirkham | 135—1 |
| 3,056,415 | 10/1962 | Nimmo | 135—4 |
| 3,266,503 | 8/1966 | Hoiness et al. | 135—1 X |

DAVID J. WILLIAMOWSKY, *Primary Examiner.*

PETER M. CAUN, *Examiner.*